US005880199A

United States Patent [19]

Matsushita et al.

[11] Patent Number: 5,880,199

[45] Date of Patent: Mar. 9, 1999

[54] LIQUID SILICONE RUBBER COMPOSITION AND METHOD FOR THE PREPARATION THEREOF

[75] Inventors: Takao Matsushita; Yasumichi Shigehisa; Yuichi Tsuji, all of Chiba Prefecture, Japan

[73] Assignee: Dow Corning Toray Silicone Co., Ltd., Tokyo, Japan

[21] Appl. No.: 861,542

[22] Filed: May 22, 1997

[30] Foreign Application Priority Data

May 24, 1996 [JP] Japan .................................... 8-152976

[51] Int. Cl.[6] ........................................................ C08K 3/34

[52] U.S. Cl. ............................ 524/492; 524/94; 524/106; 524/398; 524/424; 524/437; 524/715; 524/720; 524/785; 524/786; 524/787; 524/780

[58] Field of Search .............................. 524/94, 106, 398, 524/424, 437, 715, 720, 785, 786, 787, 780, 492

[56] References Cited

U.S. PATENT DOCUMENTS

| | | | |
|---|---|---|---|
| Re. 31,843 | 3/1985 | Noble et al. | 523/212 |
| 3,514,424 | 5/1970 | Noble et al. | 260/37 |
| 3,635,874 | 1/1972 | Laur et al. | 260/17 SB |
| 3,936,476 | 2/1976 | Itoh et al. | 260/37 SB |
| 4,754,013 | 6/1988 | Antonen | 528/15 |
| 5,652,290 | 7/1997 | Nakamura et al. | 524/860 |

*Primary Examiner*—Melvyn I. Marquis
*Attorney, Agent, or Firm*—William F. Boley

[57] ABSTRACT

A liquid silicone rubber composition that prior to its cure has a suitable fluidity and excellent moldability and that cures into a highly flame retardant silicone rubber molding with excellent electrical properties. The liquid silicone rubber composition comprises (A) polyorganosiloxane, (B) microparticulate silica, (C) aluminum hydroxide powder, (D) zinc carbonate powder, (E) polyorganohydrogensiloxane, (F) benzotriazole, (G) the reaction mixture of
  (a) a platinum compound and
  (b) 3,5-dimethyl-1-hexyn-3-ol, and (H) hydrosilylation reaction catalyst.

16 Claims, No Drawings

LIQUID SILICONE RUBBER COMPOSITION AND METHOD FOR THE PREPARATION THEREOF

BACKGROUND OF INVENTION

This invention relates to liquid silicone rubber compositions. More particularly, this invention relates to a liquid silicone rubber composition that yields a highly flame retardant cured product that also has excellent electrical properties such as tracking resistance, arc resistance, and erosion resistance. The invention additionally relates to a method for preparing the subject liquid silicone rubber composition.

Silicone rubbers are widely used in diverse applications because of their excellent heat resistance, excellent resistance to aging, and excellent electrical properties. However, a drawback to silicone rubbers is their flammability, and in response to this numerous compositions have been proposed to date that provide self-extinguishing (flame retardant) silicone rubbers. For example, Japanese Patent Publication Kokoku No. Sho 44-2591 (2,591/1969) teaches the composition afforded by blending a platinum compound flame retardant, such as chloroplatinic acid or a platinum-olefin complex, into a silicone rubber compound. However, the admixture of just a platinum compound provides only a small improvement in flame retardancy. This fact has resulted in the proposal of compositions that achieve improvements in the flame retardancy of silicone rubber through the combination of these platinum compounds and inorganic filler such as described in Japanese Patent Publication Kokoku No. Sho 47-21826 (21,826/1972) and Japanese Patent Publication Kokoku No. Sho 51-23979 (23,979/1976). Other tactics known for achieving additional improvements in the flame retardancy of the subject silicone rubber compositions consist of increasing the addition of the nonflammable inorganic filler component and reducing the addition of the flammable polyorganosiloxane component. Unfortunately, the silicone rubber compositions made by these tactics have very high viscosities and thus cannot be used in applications where fluidity is a critical factor, for example, as in injection molding.

Therefore, desired is a liquid silicone rubber composition that prior to its cure has a suitable fluidity and excellent moldability and that cures into highly flame retardant silicone rubber moldings with excellent electrical properties.

As a result of extensive investigations directed to solving the problems described above, the inventors have discovered that these problems can be solved by the admixture of specific additive components into a particular type of addition reaction-curing liquid silicone rubber composition. The present invention was achieved based on this discovery.

In specific terms, then, the object of the present invention is to provide a liquid silicone rubber composition that prior to its cure exhibits suitable fluidity and excellent moldability and that cures to give highly flame retardant silicone rubber moldings with excellent electrical properties and does so without sacrificing mechanical strength.

SUMMARY OF INVENTION

A liquid silicone rubber composition that prior to its cure has suitable fluidity and excellent moldability and that cures into a highly flame retardant silicone rubber molding with excellent electrical properties. The liquid silicone rubber composition comprises (A) polyorganosiloxane, (B) microparticulate silica, (C) aluminum hydroxide powder, (D) zinc carbonate powder, (E) polyorganohydrogensiloxane, (F) benzotriazole, (G) the reaction mixture of
  (a) a platinum compound and
  (b) 3,5-dimethyl-1-hexyn-3-ol, and (H) hydrosilylation reaction catalyst.

Also, a method for the preparation of the above-described liquid silicone rubber composition.

DESCRIPTION OF INVENTION

The present invention is a liquid silicone rubber composition comprising

A) 100 weight parts polyorganosiloxane having a viscosity at 25° C. of from 100 mPa.s to 100,000 mPa.s and the average unit formula $$R^1_aR^2_bSiO_{4-a-b/2},$$

where $R^1$ represents a monovalent hydrocarbon group excluding alkenyl groups, $R^2$ represents an alkenyl group, a has a value from 1.90 to 2.05, b has a value from 0.0005 to 0.1, and a+b has a value of 1.91 to 2.06;

(B) 10 to 60 weight parts microparticulate silica;

(C) 1 to 150 weight parts aluminum hydroxide powder;

(D) 1 to 150 weight parts zinc carbonate powder;

(E) polyorganohydrogensiloxane comprising at least 2 silicon-bonded hydrogen atoms in each molecule, in a quantity that affords a value from 0.5:1 to 20:1 for the ratio of the number of moles of silicon-bonded hydrogen to the number of moles of silicon-bonded alkenyl in component (A);

(F) 0.001 to 1 weight part benzotriazole;

(G) the reaction mixture of
  (a) a platinum compound and
  (b) 3,5-dimethyl-1-hexyn-3-ol, in a quantity that affords from 1 to 1,000 weight parts platinum metal for each 1,000,000 weight parts component (A); and (H) hydrosilylation reaction catalyst in a catalytic quantity.

The invention also relates to a method for the preparation of the above-described liquid silicone rubber composition.

To explain the preceding in greater detail, the polyorganosiloxane (A) is the base component of the present composition. $R^1$ in the formula given above for component (A) is non-alkenyl monovalent hydrocarbon groups and is exemplified by phenyl and by alkyl groups such as methyl, ethyl, propyl, butyl, and octyl. $R^2$ is alkenyl groups and is exemplified by vinyl and allyl. The subscript a has a value from 1.90 to 2.05; the subscript b has a value from 0.0005 to 0.1; and a+b has a value from 1.91 to 2.06. The polyorganosiloxane will ordinarily have a straight-chain molecular structure, but may be branched to some extent. The alkenyl can be bonded at terminal or non-terminal positions on the molecular chain or at both positions, but is preferably present at least at both molecular chain terminals based on considerations of the post-cure mechanical properties. The alkenyl may consist of only a single specific type of alkenyl group or may be a mixture of 2 or more specific types of alkenyl groups. The viscosity of polyorganosiloxane (A) at 25° C. should be from 100 mPa.s to 100,000 mPa.s and preferably is from 100 mPa.s to 50,000 mPa.s. Lower viscosities cause a decline in the mechanical strength of the cured composition, such as tear strength, while higher viscosities cause the corresponding liquid silicone rubber composition to have an excessively high viscosity and thus a diminished fluidity.

Component (A) is specifically exemplified by vinyldimethylsiloxy-endblocked polydimethylsiloxanes, vinyldimethylsiloxy-endblocked dimethylsiloxane-vinylmethylsiloxane copolymers, vinyldimethylsiloxy-endblocked dimethylsiloxane-methylphenylsiloxane copolymers, and vinyldimethylsiloxy-endblocked dimethylsiloxane-vinylmethylsiloxane-methylphenylsiloxane copolymers.

The microparticulate silica used as component (B) in the present invention is a reinforcing filler. It is an essential component whose purpose is to impart mechanical strength to the silicone rubber made by curing the present composition. The microparticulate silica is exemplified by reinforcing microparticulate silicas such as dry-process silicas, for example fumed silica, and by wet-process silicas, for example precipitated silica. The microparticulate silica is also exemplified by semi-reinforcing microparticulate silicas such as powdered quartz and diatomaceous earth. This component is preferably a microparticulate silica with a particle size ≦50 μm and a specific surface area ≧50 $m^2$/g. Even more preferred are such microparticulate silicas after a hydrophobicizing surface treatment with an organosilicon compound such as an organosilane, organosilazane, or organosiloxane oligomer. Since the addition of too little of component (B) will fail to impart a high mechanical strength and the addition of too much will cause a loss of fluidity, component (B) must be added at from 10 to 60 weight parts per 100 weight parts of component (A) and is preferably added at from 20 to 40 weight parts per 100 weight parts of component (A).

The aluminum hydroxide powder (C) functions to reduce the compounding ratio of component (A) and thereby improve the flame retardancy. The aluminum hydroxide powder preferably has a particle size from 0.1 to 50 μm and more preferably from 0.1 to 10 μm. This component is admixed at from 1 to 150 weight parts and preferably at from 10 to 120 weight parts, in each case per 100 weight parts component (A).

The zinc carbonate powder (D), like component (C), functions to improve the flame retardancy. The zinc carbonate powder preferably has a particle size ≦100 μm. Component (D) is admixed at from 1 to 150 weight parts and preferably at from 10 to 120 weight parts, in each case per 100 weight parts of component (A). In addition, the sum of the additions of component (D) and components (B) and (C) is preferably from 40 to 300 weight parts and more preferably from 50 to 180 weight parts, in each case per 100 weight parts of component (A).

The polyorganohydrogensiloxane (E) is a crosslinker for the present composition. The present composition is crosslinked and thereby cured by the addition reaction of the silicon-bonded hydrogen in component (E) with the silicon-bonded alkenyl in component (A) in the presence of hydrosilylation reaction catalyst (H). This polyorganohydrogensiloxane must contain at least 2 silicon-bonded hydrogen atoms in each molecule. Its non-hydrogen silicon-bonded organic groups are exemplified by alkyl groups such as methyl, ethyl, and propyl; aryl groups such as phenyl and tolyl; and substituted alkyl groups such as 3,3,3-trifluoropropyl and 3-chloropropyl.

Component (E) can have a straight-chain, branch-containing straight-chain, cyclic, or network molecular structure. The viscosity of component (E) at 25° C. is preferably from 3 mPa.s to 10,000 mPa.s. Component (E) is added in a quantity that will provide a value from 0.5:1 to 20:1 and preferably from 1:1 to 3:1 for the ratio of the number of moles of silicon-bonded hydrogen in the composition to the number of moles of silicon-bonded alkenyl in the composition. The present composition will not undergo an acceptable cure when this molar ratio is below 0.5. A molar ratio in excess of 20 can result in the production of gaseous hydrogen and foaming.

Benzotriazole (F) is by itself without effect, but it generates a synergistic effect when used in combination with component (G), providing a major increase in the flame retardancy of the present composition. Component (F) is added at from 0.001 to 1 weight part per 100 weight parts of component (A). When added at less than 0.001 weight part, no functional effect will be generated from its co-use. The addition of more than 1 weight part of component (F) has a pronounced tendency to cause cure inhibition and also provides no additional enhancements in flame retardancy. Since component (F) has a high melting point, its uniform dispersion in the silicone rubber composition is advantageously effected by dissolving this component in an organic solvent such as ethanol, isopropyl alcohol, benzene, toluene, and xylene.

Component (G), which is the reaction mixture of a platinum compound and 3,5-dimethyl-1-hexyn-3-ol, is the component that distinguishes the present composition. In particular, its use in combination with the benzotriazole (F) provides major improvements in the flame retardancy and electrical properties, such as tracking resistance, of the present composition. As used herein, the reaction mixture of a platinum compound and 3,5-dimethyl-1-hexyn-3-ol denotes the product generated by the reaction of these two species or the mixture of such a product with its 3,5-dimethyl-1-hexyn-3-ol precursor. The platinum compound (a) encompassed by this component is exemplified by chloroplatinic acid, the potassium and sodium salts of chloroplatinic acid, chloroplatinic acid/olefin complexes, and chloroplatinic acid/alkenylsiloxane complexes among which chloroplatinic acid and platinum/alkenylsiloxane complexes as disclosed in Japanese Patent Publication Kokoku Number Sho 42-22924 (22,924/1967) are preferred. The 3,5-dimethyl-1-hexyn-3-ol (b) is already known as a compound that inhibits the hydrosilylation reaction. The component (a): component (b) weight ratio preferably falls in the range from 1:0.1 to 1:100 and more preferably in the range from 1:1 to 1:50. The use of quantities that provide more moles component (b) than moles component (a) is also preferred. The subject reaction mixture can be prepared, for example, simply by mixing components (a) and (b), shaking or stirring at ambient or elevated temperature, and then allowing to stand. This component is added in a quantity that affords 1 to 1,000 weight parts and preferably 10 to 200 weight parts platinum metal, in each case for each 1,000,000 weight parts component (A). An acceptable flame retardancy and acceptable electrical properties, such as tracking resistance, are not obtained at below 1 weight part. No additional effects are observed for additions in excess of 1,000 weight parts.

The hydrosilylation reaction catalyst (H) is a curing catalyst for the present composition. The catalyst can be platinum metal itself, a platinum compound, or a composition whose main component is a platinum compound, in each case insofar as the selection exhibits a catalytic activity that accelerates the hydrosilylation reaction. The subject platinum hydrosilylation reaction catalysts are exemplified by microfinely divided platinum, chloroplatinic acid, alcohol-modified chloroplatinic acid, platinum/diketone complexes, platinum/olefin complexes, chloroplatinic acid/ alkenylsiloxane complexes, and these species supported on a carrier such as alumina, silica, or carbon black. This component is added in a catalytic quantity. Although the addition cannot be rigorously specified because it will vary as a function of the type of hydrosilylation reaction catalyst, as a general matter the addition will be from 1 to 500 weight parts as platinum metal and preferably from 5 to 100 weight parts as platinum metal, in each case for each 1,000,000 weight parts of component (A).

Since the curing reaction in the present composition will gradually occur with time even at room temperature, any requirement for long-term retention of a use life may be satisfied by the addition of a known addition reaction inhibitor, for example, ethynylcyclohexanol, dimethylformamide, triphenylphosphine, cyclic methylvinylsiloxanes, 3-methyl-1-butyn-3-ol, 3,5-dimethyl-1-hexyn-3-ol, cyclohexylbutynol, 3-phenyl-1-butyn-3-ol, diphenylethynylcarbinol, and 3,5-dimethyl-3-hexen-1-yne.

The present composition comprises the components (A) to (H) as described above, but may also contain, insofar as the object of the present invention is not impaired, those additives known for admixture in silicone rubber compositions. These additives are exemplified by non-reinforcing fillers, pigments, heat stabilizers, flame retardants, internal release agents, and plasticizers. The non-reinforcing fillers are specifically exemplified by calcium carbonate, mica, magnesium oxide, and aluminum oxide. The pigments are specifically exemplified by carbon black, iron oxide red, and titanium dioxide. The heat stabilizers are specifically exemplified by the rare earth oxides, rare earth hydroxides, cerium silanolate, and cerium salts of fatty acids. The flame retardants are specifically exemplified by fumed titanium dioxide, carbon black in small quantities, and manganese carbonate.

The present composition can be prepared simply by mixing the above-described components (A) to (H) in their prescribed quantities to homogeneity. In a preferred method, however, the present composition is prepared by first making a silicone rubber base compound by mixing components (A), (B), (C), and (D) and by then admixing therein components (E), (F), (G), and (H). When component (B) is a non-hydrophobicized reinforcing silica micropowder with a specific surface area $\geqq 50$ $m^2/g$, a plasticizer is preferably also added at from 1 to 30 weight parts per 100 weight parts component (A). This plasticizer is exemplified by silanol-endblocked diorganosiloxane oligomer and by hexaorganodisilazane and water. The means for mixing components (A), (B), (C), and (D) can be a known compounder such as a kneader mixer or continuous twin-screw compounding extruder. The means for admixing components (E), (F), (G), and (H) can be a mixer such as a two-roll mill or kneader mixer.

The present composition as described above has excellent pre-cure fluidity and also cures into a product with high mechanical strength and in particular with excellent flame retardancy and excellent electrical properties such as tracking resistance, arc resistance, and erosion resistance. In consequence thereof, the present compositions can be used as an electrical insulating material in applications where such properties are critical, for example, in high-voltage or high-current applications and most prominently in outdoor applications.

The invention will be explained below using working examples, in which "parts" denotes "weight parts" and the values reported for the viscosity of the polyorganosiloxanes and liquid silicone rubber compositions were measured at 25° C. The physical properties, flame retardancy, and electrical properties of the silicone rubbers were measured in the examples using the following methods.

Physical properties of the silicone rubbers were measured according to the procedures given in JIS K 6301, "Physical Testing Methods for Vulcanized Rubbers". The liquid silicone rubber composition was compression molded at 150° C. for 10 minutes to give a 2 mm-thick silicone rubber sheet. The mechanical strength values of this silicone rubber sheet were then measured according to the procedures given in JIS K 6301.

Measurement of the flame retardancy was made be filling the silicone rubber composition into a sheet-forming mold and heat-curing to give a 1 mm-thick silicone rubber sheet. This silicone rubber sheet was cut to give a test specimen with a length of 130 mm, width of 13 mm, and thickness of 1 mm. The test specimen was suspended vertically in still air and was ignited by exposure for 10 seconds to a Bunsen burner flame (11-mm flame width, 20-mm inner flame height, 40-mm outer flame height) by just contacting the bottom edge of the test specimen with the top of the inner flame. The Bunsen burner was then withdrawn from the test specimen and the time in seconds was measured until extinction of the flame ignited on the test specimen. This flame contact test was run twice on each of 5 test specimens and the average (in seconds) of the 10 measurements is reported as the flame retardancy data.

Electrical property measurement were made by running an inclined plane anti-tracking test according to International Electrotechnical Commission (IEC) Publication 587. The test instrument was a model HAT-520 from Hitachi Kasei Kogyo Kabushiki Kaisha. The test voltage was 3.5 kV. The evaluation A referenced in the test results refers to the time in minutes required until the current flowing in a high-voltage circuit passing through the test specimen exceeded 60 mA for 2 seconds. The evaluation B referenced in the test results refers to the time in minutes for tracking to reach a mark placed on the surface of the test specimen at a position 25 mm from the lower electrode.

EXAMPLE 1

The following were mixed to homogeneity into 100 parts vinyldimethylsiloxy-endblocked polydimethylsiloxane with a viscosity of 10,000 mPa.s: 25 parts fumed silica with a specific surface area of 200 $m^2/g$, 100 parts aluminum hydroxide powder with an average particle size of 1 $\mu$m, 15 parts zinc carbonate powder with an average particle size of 10 $\mu$m, 5 parts hexamethyldisilazane, and 1.5 parts water. This mixture was heated for 2 hours at 170° C. in a vacuum to give a silicone rubber base compound. The following were then mixed to homogeneity into the base compound to give a liquid silicone rubber composition: 1.4 parts trimethylsiloxy-endblocked dimethylsiloxane-methylhydrogensiloxane copolymer with a silicon-bonded hydrogen content of 0.7 weight %, 0.1 part benzotriazole, 0.8 part (corresponding to 30 ppm as platinum metal) of a reaction mixture (reaction mixture 1) of 3,5-dimethyl-1-hexyn-3-ol and a chloroplatinic acid/divinyltetramethyldisiloxane complex, and chloroplatinic acid (hydrosilylation reaction catalyst) in a quantity giving 10 ppm platinum metal.

Reaction mixture 1 was prepared by adding 500 parts of 3,5-dimethyl-1-hexyn-3-ol to 100 parts of a chloroplatinic acid/divinyltetramethyldisiloxane complex, shaking at room temperature, and then holding overnight.

The viscosity and post-cure physical properties, flame retardancy, and electrical properties of the liquid silicone rubber composition were measured, and these results are reported in Table 1. For comparison, a liquid silicone rubber composition was prepared as above, but without the addition of the aluminum hydroxide powder (Comparative Example 1). In another comparative example (Comparative Example 2), a liquid silicone rubber composition was prepared as above, but without the addition of the zinc carbonate powder. In yet another comparative example (Comparative Example 3), a liquid silicone rubber composition was prepared as above, but in this case without adding the aluminum hydroxide powder and without adding the zinc carbonate powder. The properties of these compositions were measured as above, and the measurement results are reported in Table 1 as Comparative Examples 1, 2, and 3.

EXAMPLE 2

The following were mixed to homogeneity into 100 parts vinyldimethylsiloxy-endblocked polydimethylsiloxane with a viscosity of 10,000 mPa.s: 25 parts fumed silica with a specific surface area of 200 $m^2/g$, 20 parts aluminum hydroxide powder with an average particle size of 1 μm, 10 parts zinc carbonate powder with an average particle size of 10 μm, 5 parts hexamethyldisilazane, and 1.5 parts water. This mixture was heated for 2 hours at 170° C. in a vacuum to give a silicone rubber base compound. The following were then mixed to homogeneity into this base compound to give a liquid silicone rubber composition: 1.4 parts trimethylsiloxy-endblocked dimethylsiloxane-methylhydrogensiloxane copolymer with a silicon-bonded hydrogen content of 0.7 weight %, 0.1 part benzotriazole, 0.8 part (corresponding to 30 ppm as platinum metal) of the reaction mixture 1 described in Example 1, and chloroplatinic acid (hydrosilylation reaction catalyst) in a quantity giving 10 ppm platinum metal.

The viscosity and post-cure physical properties, flame retardancy, and electrical properties of the liquid silicone rubber composition were measured, and these results are reported in Table 2. For comparison, a liquid silicone rubber composition was prepared as above, but without the addition of reaction mixture 1 (Comparative Example 4). In another comparative example (Comparative Example 5), a liquid silicone rubber composition was prepared as above, but without the addition of benzotriazole. In yet another comparative example (Comparative Example 6), a liquid silicone rubber composition was prepared as above, but in this case without adding benzotriazole and without adding reaction mixture 1. The properties of these compositions were measured as above, and the measurement results are reported in Table 2 as Comparative Examples 4, 5, and 6.

The measurement results reported in the tables show that the liquid silicone rubber composition according to the present invention cures into a highly flame retardant product with excellent electrical properties. In contrast to this, the results for the comparative liquid silicone rubber compositions demonstrate that the liquid silicone rubber composition according to the present invention has a far superior flame retardancy and far superior electrical properties to a liquid silicone rubber composition lacking just a single component from among the aluminum hydroxide powder, zinc carbonate powder, platinum compound/3,5-dimethyl-1-hexyn-3-ol reaction mixture, and benzotriazole.

Because the liquid silicone rubber composition according to the present invention comprises components (A) to (H) and in particular because it contains components (G) and (F), this composition characteristically exhibits fluidity and an excellent moldability prior to its cure and at the same time cures to give highly flame retardant silicone rubber moldings with excellent electrical properties.

The preparative method according to the present invention is characterized by its ability to efficiently produce the subject silicone rubber composition.

TABLE 1

| | Example 1 | Comp. Example 1 | Comp. Example 2 | Comp. Example 3 |
|---|---|---|---|---|
| dimethylvinylsiloxy-endblocked dimethylpolysiloxane (parts) | 100 | 100 | 100 | 100 |
| fumed silica (parts) | 25 | 25 | 25 | 25 |
| aluminum hydroxide powder (parts) | 100 | — | 100 | — |
| zinc carbonate powder (parts) | 15 | 15 | — | — |
| dimethylsiloxane/methyl-hydrogensiloxane copolymer (parts) | 1.4 | 1.4 | 1.4 | 1.4 |
| benzotriazole (parts) | 0.1 | 0.1 | 0.1 | 0.1 |
| reaction mixture 1 (amount of platinum) (ppm) | 30 | 30 | 30 | 30 |
| hydrosilylation reaction catalyst (amount of platinum) (ppm) | 10 | 10 | 10 | 10 |
| viscosity (Pa · s) | 300 | 100 | 280 | 90 |
| durometer (JIS-A) | 50 | 38 | 47 | 35 |
| tensile strength ($kg/cm^2$) | 30 | 20 | 40 | 30 |
| elongation (%) | 480 | 200 | 400 | 200 |
| flame retardancy (seconds) | 0 | 30 | 20 | did not extinguish |
| electrical properties | | | | |
| evaluation A (minutes) | ≧360 | 360 | 280 | 40 |
| evaluation B (minutes) | ≧360 | 95 | 260 | 30 |

TABLE 2

| | Example 2 | Comp. Example 4 | Comp. Example 5 | Comp. Example 6 |
|---|---|---|---|---|
| base compound (parts) | 155 | 155 | 155 | 155 |
| dimethylsiloxane/methyl hydrogensiloxane copolymer (parts) | 1.4 | 1.4 | 1.4 | 1.4 |
| benzotriazole (parts) | 0.1 | 0.1 | — | — |
| reaction mixture 1 (amount of platinum) (ppm) | 30 | — | 30 | — |
| hydrosilylation reaction catalyst (amount of platinum) (ppm) | 10 | 10 | 10 | 10 |
| viscosity (Pa · s) | 130 | 130 | 130 | 130 |
| durometer (JIS-A) | 30 | 30 | 30 | 30 |
| tensile strength ($kg/cm^2$) | 50 | 50 | 50 | 50 |
| elongation (%) | 650 | 700 | 650 | 600 |
| flame retardancy (seconds) | 2 | 28 | 17 | 50 |
| electrical properties | | | | |
| evaluation A (minutes) | ≧360 | 80 | 150 | 140 |
| evaluation B (minutes) | 220 | 75 | 130 | 130 |

We claim:

1. A liquid silicone rubber composition comprising (A) 100 weight parts polyorganosiloxane having a viscosity at 25° C. of from 100 mPa.s to 100,000 mPa.s and average unit formula

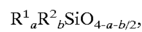

$$R^1_aR^2_bSiO_{4-a-b/2},$$

where $R^1$ represents a monovalent hydrocarbon group excluding alkenyl groups, R2 represents an alkenyl group, a has a value from 1.90 to 2.05, b has a value from 0.0005 to 0.1, and a+b has a value of 1.91 to 2.06;

(B) 10 to 60 weight parts microparticulate silica;

(C) 1 to 150 weight parts aluminum hydroxide powder;

(D) 1 to 150 weight parts zinc carbonate powder;

(E) polyorganohydrogensiloxane comprising at least 2 silicon-bonded hydrogen atoms in each molecule in a quantity that affords a value from 0.5:1 to 20:1 for the ratio of the number of moles of silicon-bonded hydrogen to the number of moles of silicon-bonded alkenyl in component (A);

(F) 0.001 to 1 weight part benzotriazole;

(G) a reaction mixture of (a) a platinum compound and (b) 3,5-dimethyl-1-hexyn-3-ol, in a quantity that affords from 1 to 1,000 weight parts platinum metal for each 1,000,000 weight parts component (A); and (H) hydrosilylation reaction catalyst in a catalytic quantity.

2. A composition according to claim 1, where the polyorganosiloxane is a vinyldimethylsiloxy-endblocked dimethylsiloxane-vinylmethylsiloxane copolymer having a viscosity from 100 mPa.s to 50,000 mPa.s at 25° C.

3. A composition according to claim 1 comprising 20 to 40 weight parts of microparticulate silica, per 100 weight parts of component (A), having a specific surface area equal to or greater than 50 $m^2$/g.

4. A composition according to claim 1 comprising 10 to 120 weight parts of aluminum hydroxide powder, per 100 weight parts of component (A), having a particle size from 0.1 μm to 10 μm.

5. A composition according to claim 1 comprising 10 to 120 weight parts of zinc carbonate powder, per 100 weight parts of component (A), having a particle size less than or equal to 100 μm.

6. A composition according to claim 1, where the sum of the weights of components (B), (C), and (D) is 50 to 180 weight parts per 100 weight parts of component (A).

7. A composition according to claim 1, where polyorganohydrogensiloxane has a viscosity at 25° C. from 3 mPa.s to 10,000 mPa.s.

8. A composition according to claim 7, where the ratio of the number of moles of silicon-bonded hydrogen provided by the polyorganohydrogensiloxane to the number of moles of silicon-bonded alkenyls provided by the polyorganosiloxane is from 1:1 to 3:1.

9. A composition according to claim 1, where the platinum compound (a) in component (G) is a complex of chloroplatinic acid and divinyltetramethyldisiloxane.

10. A composition according to claim 1, where the platinum compound (a) in component (G) is chloroplatinic acid.

11. A composition according to claim 1, where the weight ratio of component (a) to component (b) is in the range from 1:0.1 to 1:100.

12. A composition according to claim 1, where the weight ratio of component (a) to component (b) is in the range from 1:1 to 1:50.

13. A composition according to claim 1, where the reaction mixture of component (a) and component (b) is added in a quantity that affords 10 to 200 weight parts platinum metal per 1,000,000 weight parts of component (A).

14. A liquid silicone rubber composition comprising (A) 100 weight parts of vinyldimethylsiloxy-endblocked dimethylsiloxane-vinylmethylsiloxane copolymer having a viscosity at 25° C. of from 100 mPa.s to 50,000 mPa.s;

(B) 20 to 40 weight parts microparticulate silica having a specific surface area equal to or greater than 50 $m^2$/g;

(C) 10 to 120 weight parts aluminum hydroxide powder having a particle size from 0.1 μm to 10 μm;

(D) 10 to 120 weight parts zinc carbonate powder having a particle size less than or equal to 100 μm;

(E) polyorganohydrogensiloxane comprising at least 2 silicon-bonded hydrogen atoms in each molecule in a quantity that affords a value from 1:1 to 3:1 for the ratio of the number of moles of silicon-bonded hydrogen to the number of moles of silicon-bonded vinyl in component (A);

(F) 0.001 to 1 weight part benzotriazole;

(G) a reaction mixture of (a) a platinum compound and (b) 3,5-dimethyl-1-hexyn-3-ol, in a quantity that affords from 10 to 200 weight parts platinum metal for each 1,000,000 weight parts component (A); and (H) hydrosilylation reaction catalyst in a catalytic quantity.

15. A composition according to claim 14, where the platinum compound (a) in component (G) is a complex of chloroplatinic acid and divinyltetramethyldisiloxane and the weight ratio of component (a) to component (b) is in the range from 1:1 to 1:50.

16. A composition according to claim 14, where the platinum compound (a) in component (G) is chloroplatinic acid and the weight ratio of component (a) to component (b) is in the range from 1:1 to 1:50.

* * * * *